Figure 1:
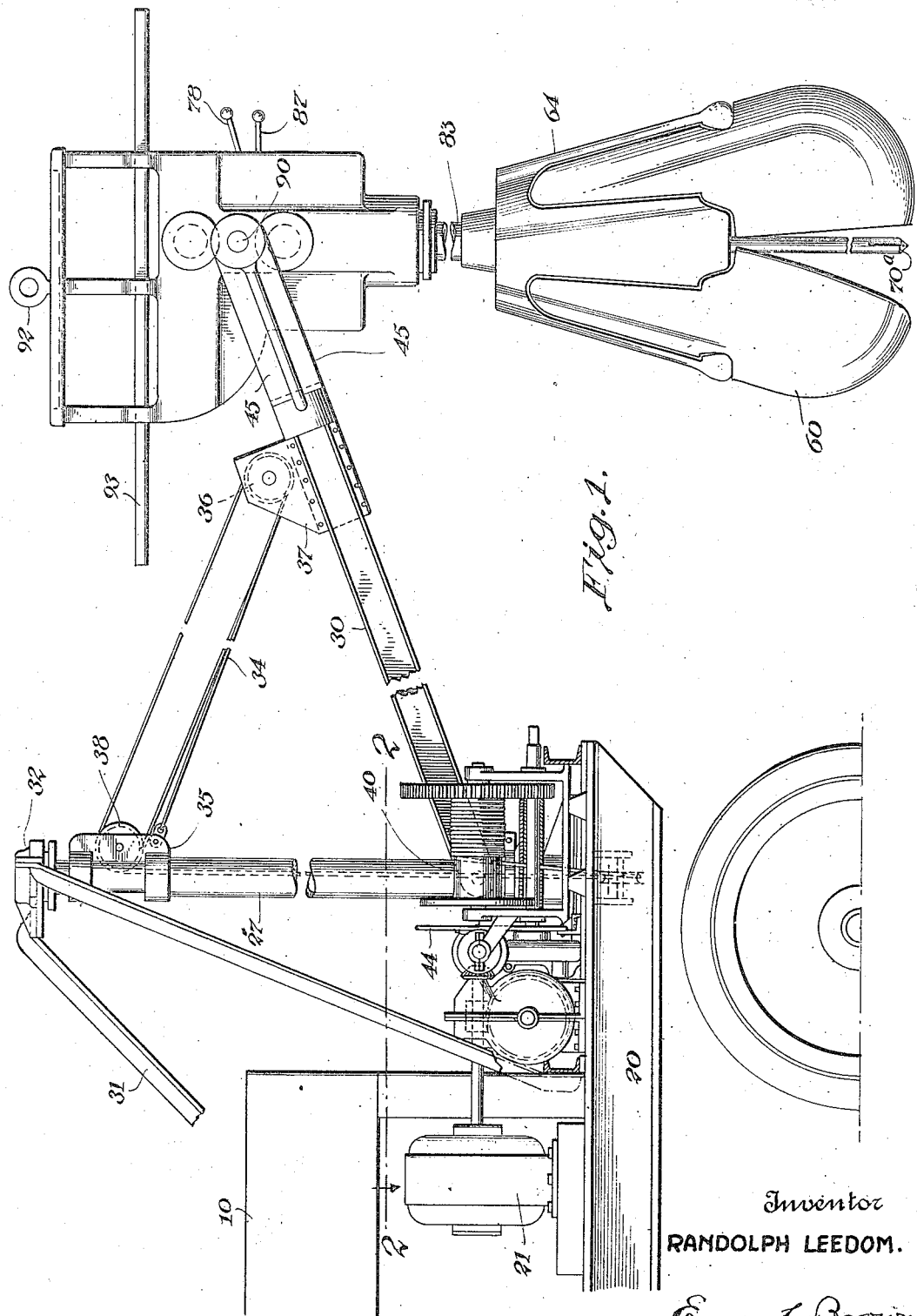

July 1, 1924.
R. LEEDOM
EARTH BORING MACHINE
Filed Aug. 8, 1922
1,499,938
5 Sheets-Sheet 2
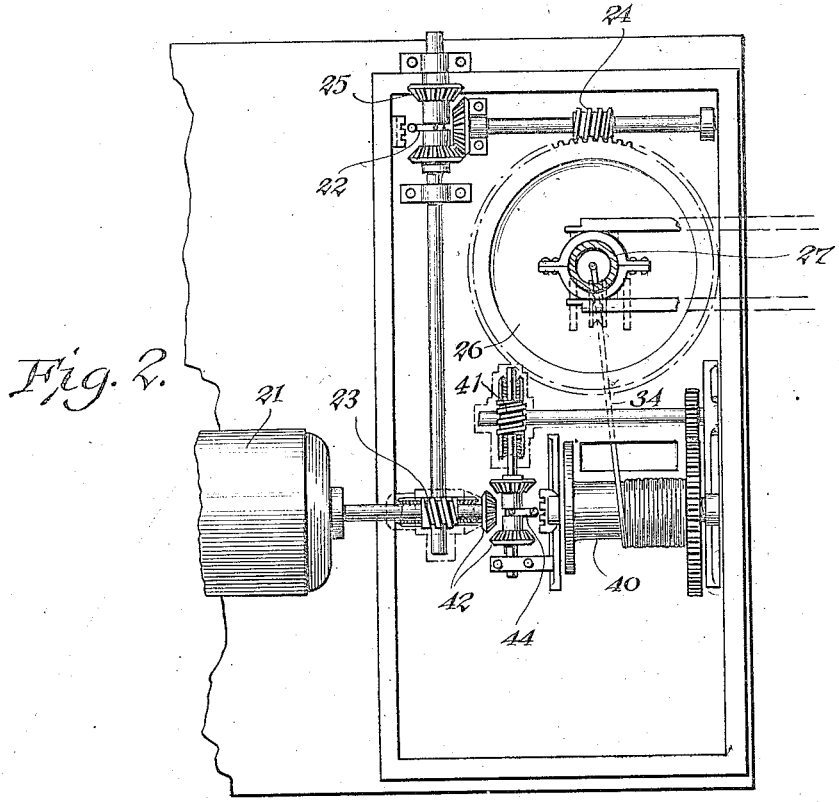
Fig. 2.
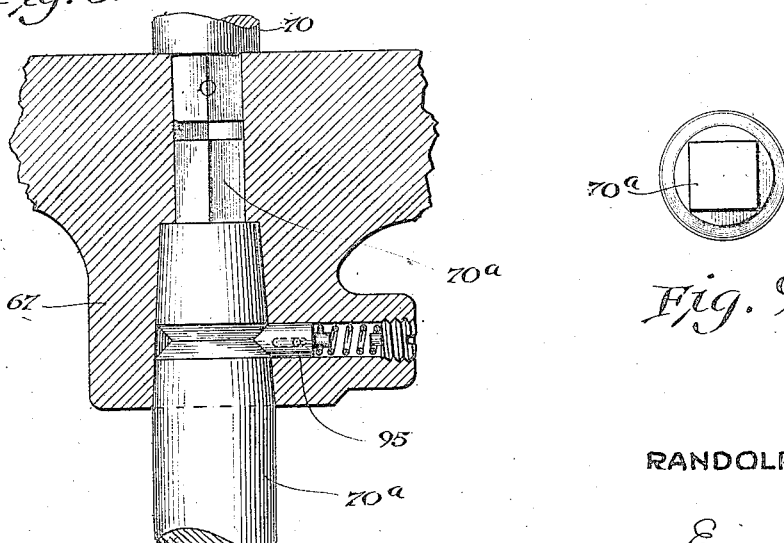
Fig. 8.
Fig. 9.
Inventor
RANDOLPH LEEDOM.
Eugene C. Brown
Attorney July 1, 1924.
R. LEEDOM
1,499,938
EARTH BORING MACHINE
Filed Aug. 8, 1922      5 Sheets-Sheet 3
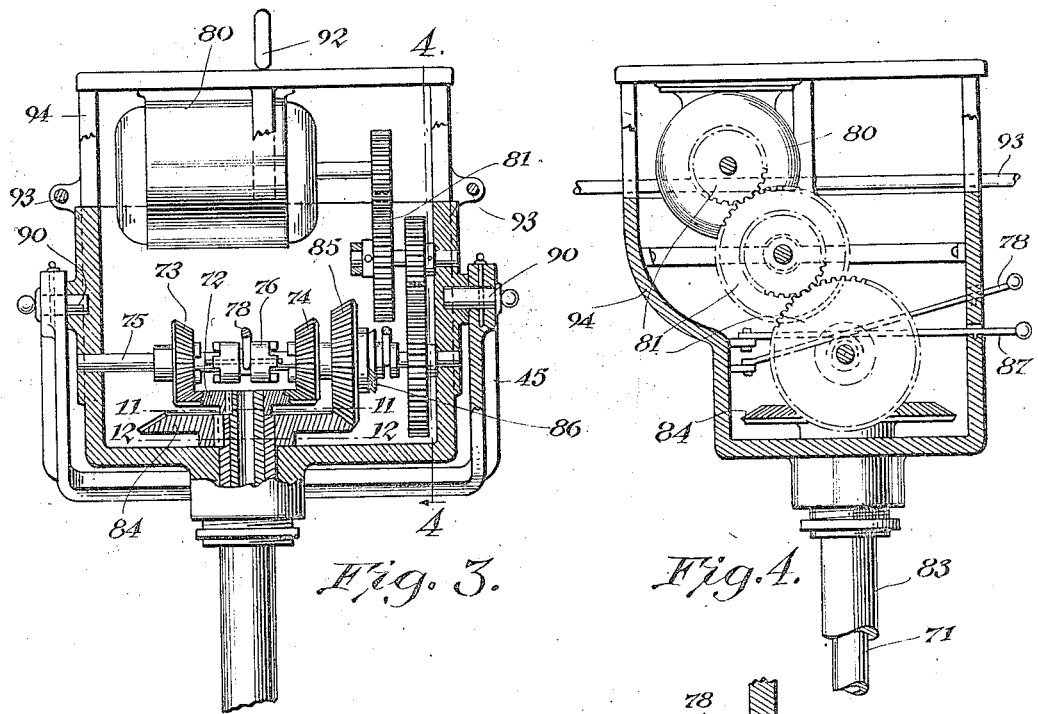
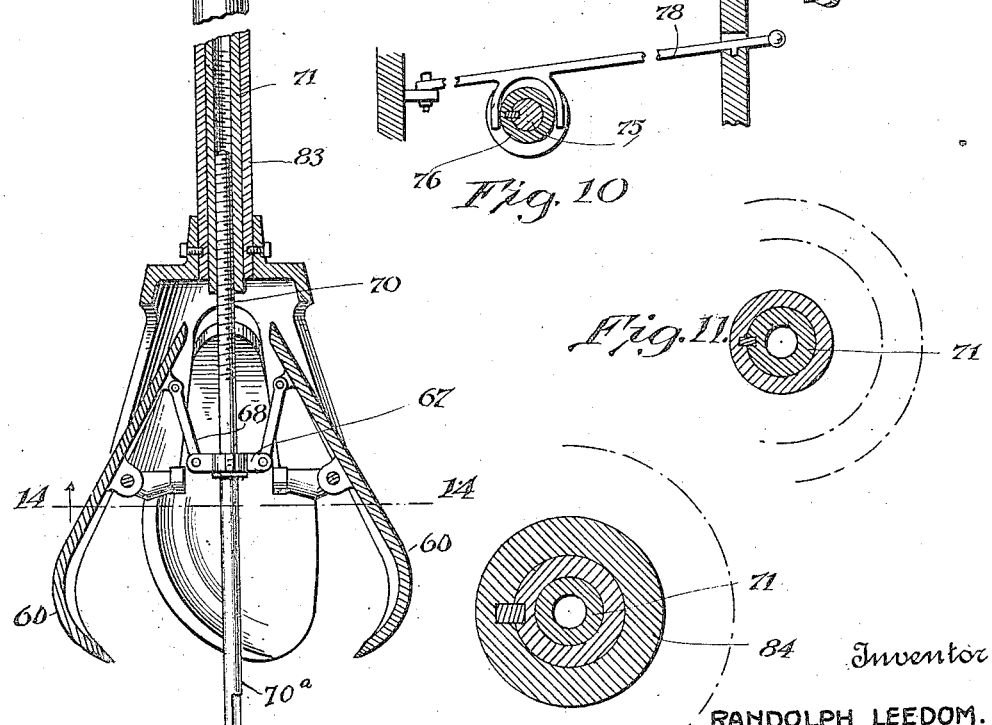
Inventor
RANDOLPH LEEDOM.
Eugene C. Brown
Attorney

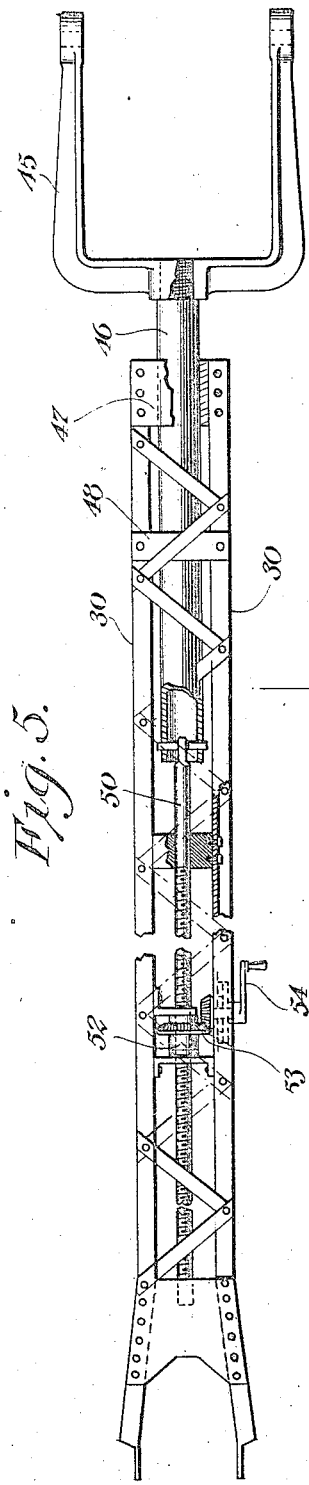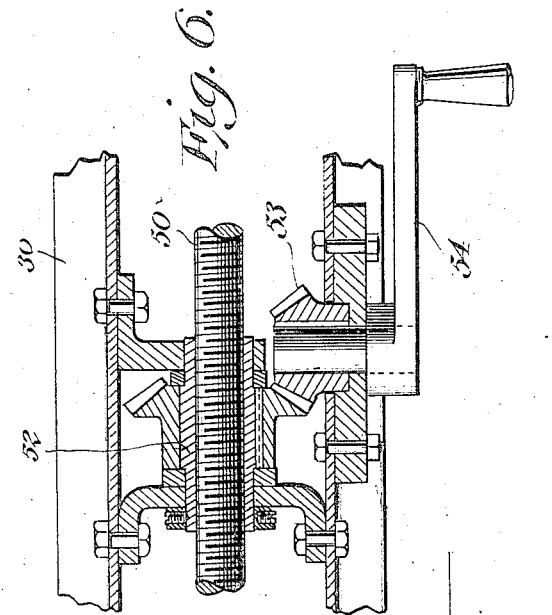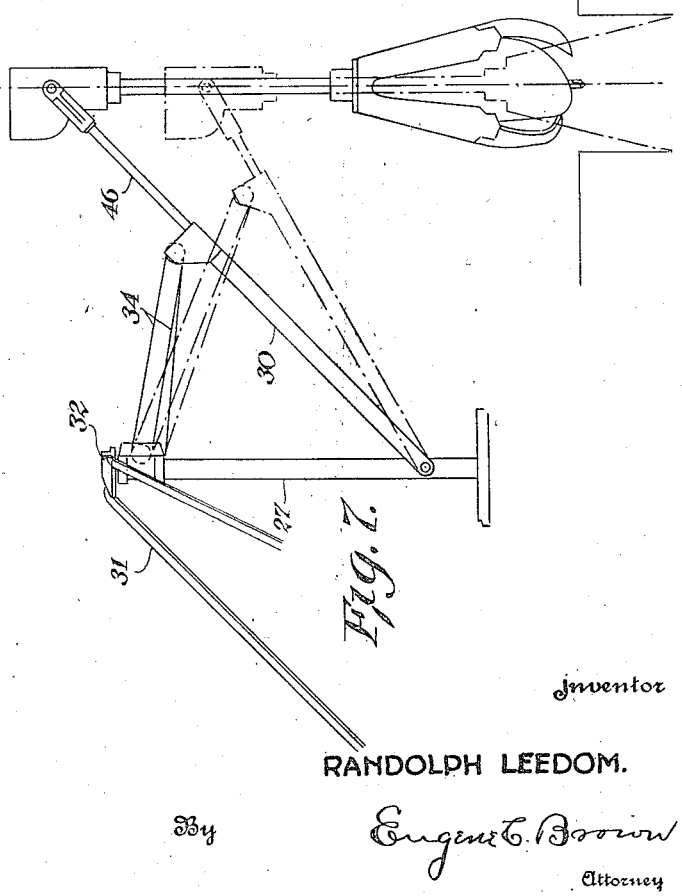

July 1, 1924.  1,499,938
R. LEEDOM
EARTH BORING MACHINE
Filed Aug. 8, 1922   5 Sheets-Sheet 5

Inventor
RANDOLPH LEEDOM.
Eugene C. Brown
Attorney

Patented July 1, 1924.

1,499,938

UNITED STATES PATENT OFFICE.

RANDOLPH LEEDOM, OF CLIFTON, NEW JERSEY, ASSIGNOR TO THE WESTERN UNION TELEGRAPH COMPANY, OF NEW YORK, N. Y., A CORPORATION OF NEW YORK.

EARTH-BORING MACHINE.

Application filed August 8, 1922. Serial No. 580,410.

*To all whom it may concern:*

Be it known that I, RANDOLPH LEEDOM, a citizen of the United States, residing at Clifton, in the county of Passaic and State of New Jersey, have invented certain new and useful Improvements in Earth-Boring Machines, of which the following is a specification.

This invention relates to machines for boring holes in the earth and is especially adapted for boring holes for telegraph and telephone poles and the like.

In machines using augers of the screw type, different sized augers are required for boring different sized holes which involves a duplication of tools and a considerable loss of time in making the changes. Such machines require considerable power to drive the augers, necessitating a comparatively large and expensive power plant. Moreover, the screw augers are practically useless when rock of any considerable size is encountered in the bore.

Machines employing augers of the scoop type have heretofore required a duplication of these expensive augers for drilling different sized holes. In heavy packed soil, such as clay or gumbo, the earth is difficult to remove after lifting the auger from the hole and frequently it is necessary to stop the machine and pry the material out by hand. Again, when rock is struck in the side of the hole, it is necessary to lift the auger out and loosen and remove the rock by hand. Furthermore, it is common to suspend the auger and digging shaft from the boom by a rope and consequently the torsional force on the auger and shaft must be counterbalanced by hand with unsatisfactory results, and irregular holes.

The purpose of my invention is to overcome the difficulties above pointed out by providing an auger which can be expanded or contracted to bore holes of varying sizes. The construction is such that the closed auger is considerably smaller in diameter than the hole, thus enabling the tool to be lifted easily. The shape of the blades prevents the loose material already in the auger from overflowing between the blades while digging and serves to hold the earth securely as it is being lifted out. The toggle mechanism which operates to adjust the position of the blades serves also to exert a positive pushing action to expel the earth as the blades are moved to the open position. The provision of a removable centering pin insures ease of starting and accurate boring, while the nature of the digging arm connection at the boom end, mechanically resists the rotative torque, at the same time providing a certain requisite amount of flexibility.

Figures 13, 15:
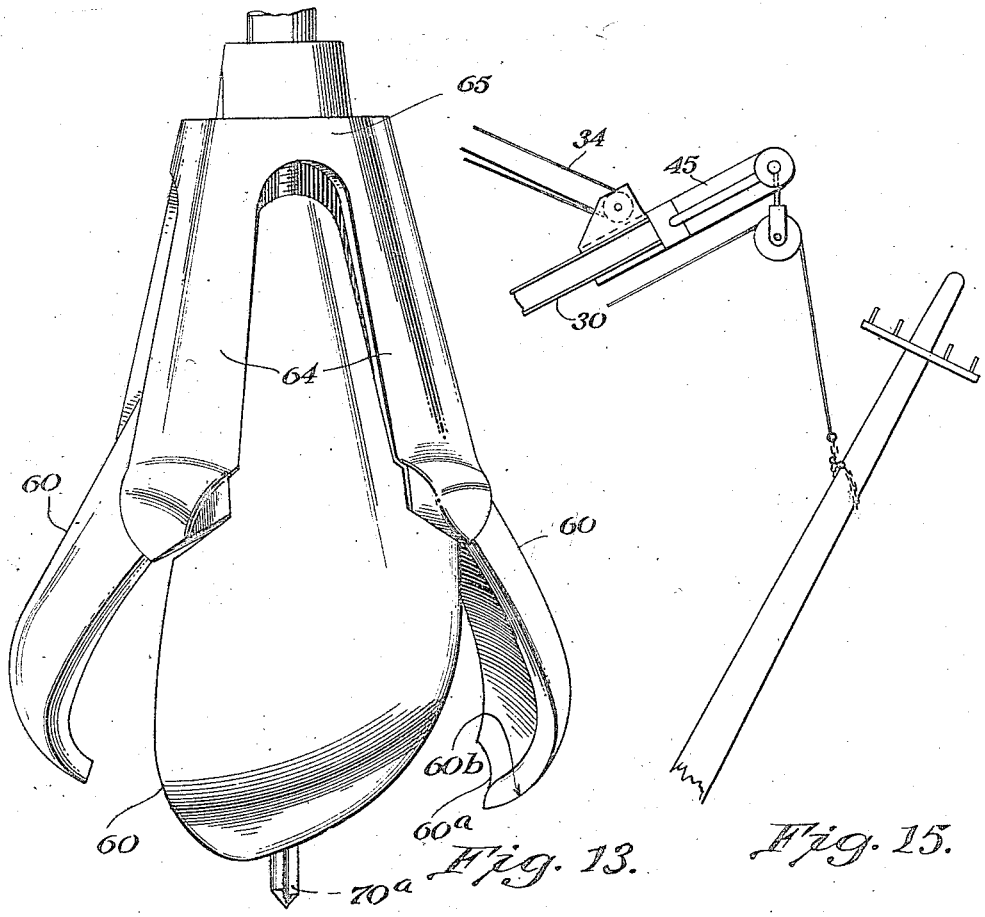
Figure 14:
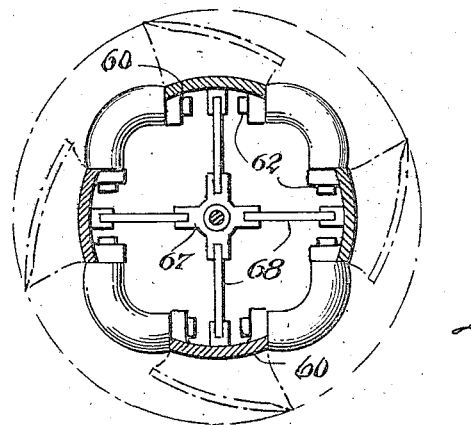

In the following description I shall refer to the accompanying drawing, in which— Figure 1 is a side elevation of a machine embodying my invention; Fig. 2 is a fragmentary sectional view on the line 2—2 of Fig. 1; Fig. 3 is a side elevation, mostly in section of the auger and its driving mechanism; Fig. 4 is vertical sectional view on the line 4—4 of Fig. 3; Fig. 5 is a plan view, partly broken away of the boom and adjustable yoke for suspending the auger; Fig. 6 is an enlarged sectional detail view of the adjusting mechanism for positioning the yoke with respect to the boom; Fig. 7 is a diagrammatic illustration showing the boom in different elevated positions; Fig. 8 is an enlarged detail showing the connection of the detachable centering or guiding pin to the toggle spider; Fig. 9 is an end view of the centering pin; Fig. 10 is a detail view of the shifting lever for changing the gears in the auger drive; Figs. 11 and 12 are sectional views on the lines 11—11 and 12—12 of Fig. 3, respectively; Fig. 13 is an enlarged perspective view of the auger; Fig. 14 is a transverse sectional view on the line 14—14 of Fig. 3; and Fig. 15 is an illustrative diagram showing the manner of raising a pole into position.

The earth boring machine shown in the drawings is of the portable type, being mounted upon a motor truck 20. The boom control driving power may be in the form of an electric motor 21 operatively connected through worm gearing 23 and 24 and reversing gears 25 with the turn table 26 which carries the main mast 27 to which the boom 30 is pivotally secured. The mast is rigidly braced against lateral displacement by one or more guy-beams 31 secured to the mast head casting 32 in which the mast is freely rotatable. The boom of the derrick is raised and lowered by means of the wire-rope hoisting line 34, secured at one end to the mast-head sheave holder 35 and passing over the sheaves 36 in the boom head casting 37 and the sheave 38 at the mast head down through the hollow mast, and wound upon the hoisting drum 40 which is connected to the driving motor through the worm gears 41 and reversing gears 42.

The yoke 45 in which the trunnions of the auger driving mechanism are secured, is carried by a tubular stem 46 which is slidable between guides 47 and 48 on the boom 30 and is moved toward or away from the boom telescopically by means of a threaded rod 50 secured to the inner end of the stem 46, the rod being engaged by a nut 52 which may be rotated in fixed guides by means of gearing 53 and the crank handle 54.

The scoop auger is of the "orange peel type" and comprises a plurality of cutter blades 60 pivoted intermediate their length upon pivot bolts 62 projecting inwardly from opposite angle bars or rods formed integral with the lower ends of the conically disposed arms 64 of the spider base or head member 65 of the auger. The lower portions of the blades are scooped-shaped and have lower inclined and lateral cutting edges 60ª and 60ᵇ, while the upper portions taper upwardly to fit within the downwardly tapering recesses between the arms 64.

The blades are rocked upon their fulcrum pivot bolts 62 to open or close the auger by a toggle mechanism comprising a spider 67 to which the inner ends of the toggle levers 68 are pivoted, their outer ends being pivotally connected to ears or lugs upon the inside of the blade members adjacent their upper ends. The spider 67 is secured adjacent the lower end of a threaded rod or stem 70 which telescopes within an interiorly threaded tubular rotary stem 71 carrying at its upper end a bevel gear 72, which is in mesh with gears 73, 74, loose on shaft 75. The removable centering or guiding pin 70ª is held in place by means of a spring latch 95. A clutch 76, splined to the shaft 75 is shiftable into engagement with either gear 73 or 74 by means of the handle 78. The shaft 75 is driven by the motor 80 through any suitable reduction such as gearing 81.

The auger is secured to the lower end of a tubular shaft 83, which surrounds the shaft 71 and carries the bevel gear 84 at its upper end. A loose gear 85 in mesh with the bevel gear 84 may be driven from the shaft 75 by shifting the clutch 86, by means of the handle 87.

The auger and its driving mechanism constitute a boring unit and are normally swung upon trunnion pins 90 in the yoke 45. If occasion requires, however, this boring unit may be lifted from the yoke 45, by removing the trunnion pins 90, and either suspended from a cable by means of the eye-bolt 92, or manually controlled by means of one or more bars 93 passed through lugs on the casing 94. Thus my auger can be used at a distance from the truck in places which are quite inaccessible, as on steep hillsides, since the driving mechanism embodies its own motor and the drill casing can be held and guided by several men, it being merely necessary to have a conductor cable extending back to the generating set on the truck or to any other available source of electric power. This is an advantage which is not found in prior earth boring machines.

The operation of my earth boring machine will be understood from the prior detailed description of the operating device. The truck is driven as usual by means of a gasolene engine or other suitable motive power, indicated conventionally at 10 and it also drives a suitable electric generator, not shown, which furnishes the current to operate the motors 21 and 80. When the truck has been driven to the proper location, the motor 21 is started and the lever 22 is moved into a position to connect one or the other of the gears 25 to rotate the turn table 26 in the proper direction to swing the derrick so that the boom will extend over the place where the hole is to be bored. After disengaging the gears 25 the clutch lever 44 is moved to connect the motor 21 through the gearing 42 to operate the hoisting drum 40, thereby raising or lowering the boom until the auger is positioned. After starting the motor 80, the lever 78 is moved to engage the clutch 76 with one of the gears 73 or 74 to rotate the tubular shaft 71, thereby operating the stem 70 which causes the toggle levers 68 to open the blades of the auger the amount necessary to bore a hole of the predetermined diameter. After swinging the clutch 76 into neutral position, the lever 87 is moved to engage the clutch 86 with the gear 85 which rotates the stem 83 of the auger. When the auger has been substantially filled, the clutch 76 is thrown into reverse position to rotate the stem 71, thereby lifting the stem 70 and closing the blades of the auger sufficiently to retain the earth and contracting the diameter of the auger so that it may be easily lifted from the hole. The hoisting drum is then operated to lift the boom, after which the mast is swung around into position for dumping and the clutch 76 is then shifted to cause the toggles to move downwardly, thereby swinging the blades into open position. As the spider 67 descends, it assists in forcibly expelling the earth from the blades. During this dumping operation it is not necessary to stop the rotation of the auger.

If at any time during the boring, a rock or obstruction is encountered the separation of the digging blades may be varied within reasonable limits to avoid the obstruction without interfering with the progress of the boring.

It is desirable that the stem of the auger should be maintained in a vertical position while the angularity of the boom is necessarily changed as the boring progresses. This difficulty has been overcome in my machine by adjusting the stem 46 which carries the yoke 45 telescopically within the boom to correspond with the variations in the angularity of the boom. This is accomplished by turning the handle 54 to rotate the nut 52, thereby moving the threaded stem 50 in one direction or the other and causing a corresponding movement in the yoke 45. By this adjustment the stem or shaft of the auger can always be maintained in a vertical position regardless of the contour of the ground, or of the relative positions of the tractor and auger on the ground. The importance of this feature will be appreciated by engineers who have had experience in the boring of holes for telegraph poles.

By reason of the screw and worm connections between the operating parts of the mechanism, the blade positions will be locked automatically and the derrick will also be locked automatically in any adjusted position.

I claim:—

1. An earth boring machine comprising a vehicle, a derrick having a mast rotatably supported upon the vehicle, a boom pivotally carried thereby and a hoisting drum having a cable connected to the boom, and a boring unit pivotally mounted on the outer end of the boom to swing in any vertical plane and comprising a rotary auger and a driving motor operatively connected to the auger.

2. An earth boring machine as set forth in claim 1, the auger having pivotally mounted blades, and reversible means actuated by the motor for opening and closing the blades.

3. An earth boring machine, comprising a vehicle, a derrick rotatably mounted thereon and provided with a swinging boom and hoisting apparatus therefor, a boring unit pivotally mounted on the outer end of the boom and comprising a rotary auger and a driving motor operatively connected to the auger, and means for adjusting the position of said boring unit by lengthening the boom, thereby maintaining the auger in a vertical position.

4. An earth boring machine, comprising a vehicle, a derrick rotatably mounted thereon and provided with a swinging boom and hoisting apparatus therefor, a yoke having a stem adjustable telescopically within said boom, and a boring unit pivotally secured to said yoke, and comprising a rotary auger and a driving motor operatively connected to the auger.

5. An earth boring machine, comprising a vehicle, a swinging boom rotatably mounted thereon and hoisting apparatus therefor, a boring unit adjustably secured to the end of the boom and pivoted to swing in any vertical plane and comprising an auger having a plurality of pivoted blades and a motor operatively connected to rotate the auger and reversibly connected to move the blades to open or closed position.

6. An earth boring machine as set forth in claim 5 and means for adjusting the position of the boring unit lengthwise of the boom.

7. In an earth boring machine, a boring unit comprising an auger having blades pivoted intermediate their ends and provided with a hollow shaft, a motor operatively connected to rotate said shaft, a stem longitudinally movable through said shaft and having pivoted link connections with said blades, and reversible gearing connecting said motor with said shaft.

8. A machine as set forth in claim 7, and said stem carrying means for ejecting earth from the auger as the blades are opened.

9. In an earth boring machine, a boring unit, comprising an auger having a spider base provided with conically disposed arms and a plurality of blades pivoted intermediately to the lower ends of said arms, the lower portions of said blades being spoon-shaped and provided with lateral and bottom cutting edges, and the upper portions of said blades being tapered to pass between and close the spaces between said arms when the blades are in a closed position, a hollow shaft extending upwardly from said auger base, a stem longitudinally movable through said shaft, and toggle links connecting said stem and the upper ends of said blades.

10. A machine as set forth in claim 9, and a motor operatively connected to rotate said shaft and reversibly connected to move said stem in opposite directions within said shaft.

In testimony whereof I affix my signature.

RANDOLPH LEEDOM.